United States Patent [19]

Sato et al.

[11] Patent Number: 4,704,617

[45] Date of Patent: Nov. 3, 1987

[54] THERMAL SYSTEM IMAGE RECORDER

[75] Inventors: Hiroshi Sato, Kodaira; Kohei Kadowaki, Kawasaki; Kaoru Naito, Yokohama; Kenji Toyoda, Chigasaki; Hidehisa Tsuchihashi, Kawasaki, all of Japan

[73] Assignee: Nippon Kogaku K. K., Tokyo, Japan

[21] Appl. No.: 811,430

[22] Filed: Dec. 20, 1985

[30] Foreign Application Priority Data

Dec. 24, 1984 [JP] Japan .............................. 59-272665
Apr. 9, 1985 [JP] Japan .................................. 60-74756

[51] Int. Cl.⁴ .......................... G01D 15/10; B41J 3/20
[52] U.S. Cl. ................................. 346/76 PH; 400/120
[58] Field of Search ..................... 346/76 PH; 400/120

[56] References Cited

U.S. PATENT DOCUMENTS 4,475,112 10/1984 Washio et al. .................... 346/1.1 X
4,492,482 1/1985 Eguchi et al. .................... 400/120 X
4,492,965 1/1985 Ohnishi et al. ................... 346/1.1 X
4,517,590 5/1985 Nagashima et al. ............. 358/75 X Primary Examiner—E. A. Goldberg
Assistant Examiner—Gerald E. Preston
Attorney, Agent, or Firm—Shapiro and Shapiro

[57] ABSTRACT

A printer comprises image signal generating element for repeatedly generating one line of image signal, compare element having a plurality of reference levels and comparing the image signal with selected one of the reference levels, thermal head element having a line of heating elements for printing one line of image signal, current supply element for supplying currents to the heating elements in accordance with the compare results, setting element for setting a continuous energization period for supplying the current to the heating elements from the supply element, and control element for controlling the supply element to provide a first period during which the energization of the heating elements in a first group is inhibited and a second period during which the energization of the heating elements in a second group are inhibited.

11 Claims, 21 Drawing Figures

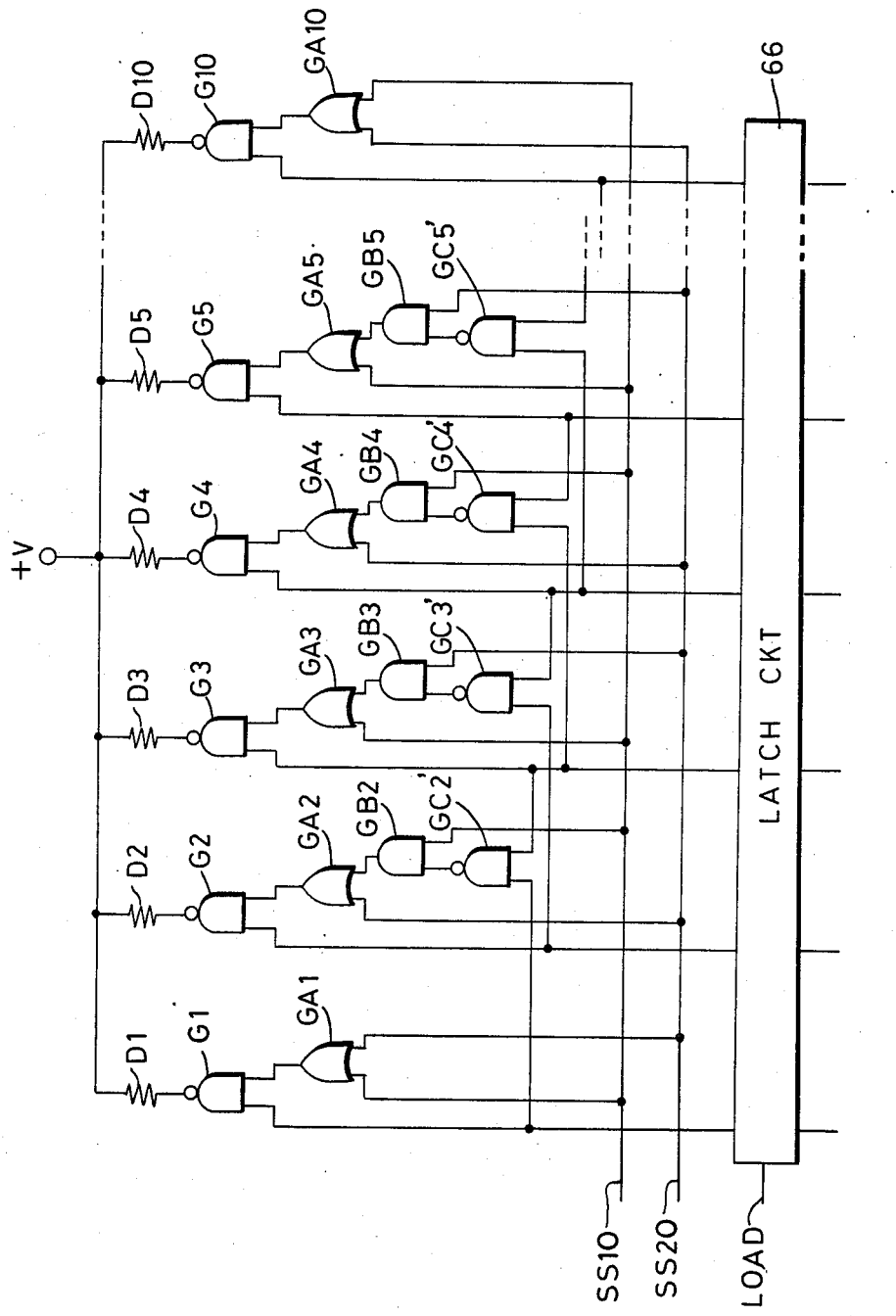

THERMAL SYSTEM IMAGE RECORDER

BACKGROUND OF THE INVENTION

1. Field of the Invention

The present invention relates to an improvement in a thermal image recording system for reproducing a two-dimensional image in which one line of picture elements is printed on a thermal record medium by selectively energizing heating dots of a thermal head, the record medium is then shifted by one line and then the next line of picture elements is printed and so on.

2. Description of the Prior Art

A method for reproducing an image in a form of high quality hard copy comparable to a photograph (called a pictorial hard copy) from an electrical image signal supplied by television, video camera or electronic still camera has been extensively studied. One of the most effect methods is a thermal image recording method in which a thermal record medium (which includes not only a thermal coloring type medium but also a medium comprising an image sheet and a thermal transfer ink sheet) is moved on a linear thermal head having a line of heating dots and the heating dots are selectively energized in accordance with an input image signal so that one line of picture elements is thermally printed on the record medium, and the above operation is repeated for each line to sequentially print the lines of picture elements. FIG. 1 shows such a recorder. I denotes a thermally transferable ink sheet. A mixture of sublimative dye and binder is applied to an upper surface of the sheet. An image sheet R has an image layer, which accepts the sublimative dye and colors it, applied on a lower surface thereof. The thermal transfer sheet I and the image sheet R are contacted to each other and transported to the right as a platen P rotates. A thermal head TH selectively heats the sheet in accordance with an input image signal applied to a terminal E. At the heated areas, the sublimative dye on the thermal transfer ink sheet I is transferred to the image sheet R so that the image is printed thereon. The thermal head TH has fine dot heating elements HE arranged in a line normal to the plane of the drawing.

The number of heating dots corresponding to one line of picture elements may amount to 1280 depending on the size of the image. If the number of dots is so large and all elements in one line are to be printed in the same color, a maximum current which flows in one-line printing is very large and a high capacity power supply is required therefore.

As shown in FIG. 2A, it has been proposed to divide the heating dots into two blocks $B_a$ and $B_b$ and drive those blocks at sequential timing. In this method, the time required to print one line of picture elements is doubled but the maximum current required is reduced to one half.

When one heating dot is energized, it exhibits a temperature distribution as shown in FIG. 3. If all heating dots in one block are energized, a temperature at the boundary of the energized block $B_a$ (hatched dots in FIG. 4A) and the non-energized block $B_b$ (non-hatched dots) is low because of the presence of the low temperature non-energized block $B_b$ beyond the boundary and the heat dissipation thereto. This phenomenon is unavoidable. The same phenomenon occurs when the block $B_b$ is next energized, as shown in FIG. 4B. Accordingly, at the boundary of the blocks, the temperature is not sufficiently high in the first energization and the second energization (see FIG. 4C). As a result, the printed picture elements are discontinuous at the boundary and white dots appear. The white dots appear in the printed image as a white stripe (called a white line). Such a white line is a fatal defect when a high quality image comparable to a photograph is required.

An alternate block print system has been proposed, in which the dots are not divided into the blocks at the center of the line of dots but alternate dots are arranged in the respective blocks as shown in FIG. 2B. Namely, the odd-numbered dots belong to the block $B_1$ and the even-numbered dots belong to the block $B_2$, and the blocks $B_1$ and $B_2$ are alternately energized.

In this alternate system as well as other systems, in order to obtain a high quality print image comparable to a photograph, it is necessary to reproduce gray levels by controlling print densities of the picture elements, that is, amounts of coloring materials such as dyes to be transferred.

The number of picture element densities is an important factor. It is usually 16, 32, 64, 128 or 256. A most effective method to form the picture elements having such gray levels by a thermal head is to change a print (energization) time period. The print time and the density generally have a relationship as shown in FIG. 5.

The following method is usually used to control the print time. The time required to attain the highest density is divided by the number of gray levels to be reproduced or a higher number, with the sum of the pulse widths of the pulses being equal to the time required to attain the highest density. (The widths of the respective pulses are not necessarily equal.) A selected number of those pulses are applied to the dots of the thermal head to attain the desired gray levels.

In the proposed alternate system, the pulses are controlled up to the maximum gray level n (for example, n=64) in the first block $B_1$, and then the pulses are controlled up to the maximum gray level n in the block $B_2$, and these operations are alternately repeated. Accordingly, the block printing requires a print time of $2 \times T$ milliseconds, where T is the time to complete printing of one line of picture elements without block printing.

According to an experiment done by the inventors of the present invention for the proposed alternate block printing system, it has been found that the picture elements formed by the dots of the later energized block are darker than those of the earlier energized block because of a heat storage effect of the earlier energized block and a proximity effect. As a result, dark stripes appear in the final two-dimensional image on every other picture element line along the direction of movement of the record sheet.

SUMMARY OF THE INVENTION

It is an object of the present invention to provide an image recorder which does not need a high capacity power supply and reduces the print time for one line of dots by a thermal head.

In accordance with the present invention, in an image recorder having a linear thermal head comprising a number of heating dots, the dots are divided into two blocks, one comprising odd-numbered dots and the other comprising even-numbered dots, and odd-numbered gray level printing is effected in the one block while even-numbered gray level printing is effected in the other block.

BRIEF DESCRIPTION OF THE DRAWINGS

FIG. 18 shows a further improvement of FIG. 17.

DESCRIPTION OF THE PREFERRED EMBODIMENTS

In order to simplify the description, it is assumed in the embodiments that an electrical image signal has already been decomposed to monochromatic image signals.

Figure 6:
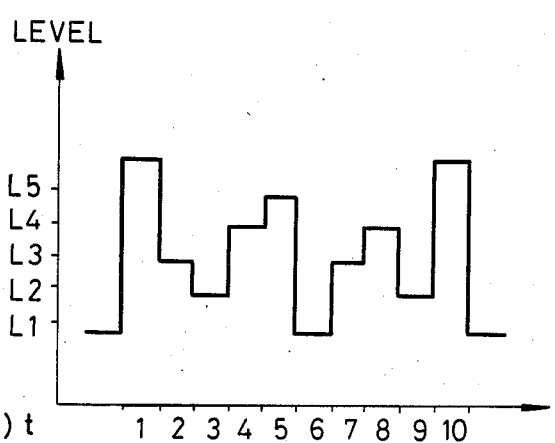
FIG. 6 shows an image signal.

The electrical image signal is time-serially inputted from the first line to the last line. As an example, the first line of the image signal is shown in FIG. 6. This image signal is divided into ten sections along a time axis with each section corresponding to each picture cell or each heating dot.

In the present embodiment, a gray level is represented by an energization time for a heating dot. To simplify the description, it is assumed that six gray levels 0,1,2,3,4 and 5 are used ten picture elements are included in one line. One line of image signal is read out of the memory unit and it is sequentially compared with five reference levels $L_1, L_2, \ldots L_5$ which are proportional to densities. After the image signal has been compared with one reference level, it is again read out of the memory unit for the comparison with the next reference level. It is repeatedly read out by the number of times equal to the number of reference levels of one line of image signal. If it is equal to or higher (draker) than the reference level, "1" is produced, and if it is lower (lighter) than the reference level, "0" is produced, and a "0" or "1" level data is produced for each reference level. The image data shown in FIG. 6 is represented by the level data as shown in table 1, in which "0" represents non-print and "1" represents print.

TABLE 1

| Reference Level | Level Data | | | | | | | | | | Symbol |
|---|---|---|---|---|---|---|---|---|---|---|---|
| $L_5$ | 1 | 0 | 0 | 0 | 0 | 0 | 0 | 0 | 0 | 1 | $LD_{15}$ |
| $L_4$ | 1 | 0 | 0 | 0 | 1 | 0 | 0 | 0 | 0 | 1 | $LD_{14}$ |
| $L_3$ | 1 | 0 | 0 | 1 | 1 | 0 | 0 | 1 | 0 | 1 | $LD_{13}$ |
| $L_2$ | 1 | 1 | 0 | 1 | 1 | 0 | 1 | 1 | 0 | 1 | $LD_{12}$ |
| $L_1$ | 1 | 1 | 1 | 1 | 1 | 0 | 1 | 1 | 1 | 1 | $LD_{11}$ |
| Time (t) flow | 1 | 2 | 3 | 4 | 5 | 6 | 7 | 8 | 9 | 10 | |

Figure 7:
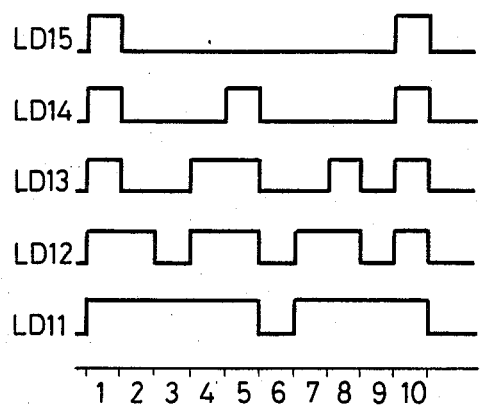
FIG. 7 shows block level data.

Electrical signal waveforms of the level data are shown in FIG. 7.

Figure 8:
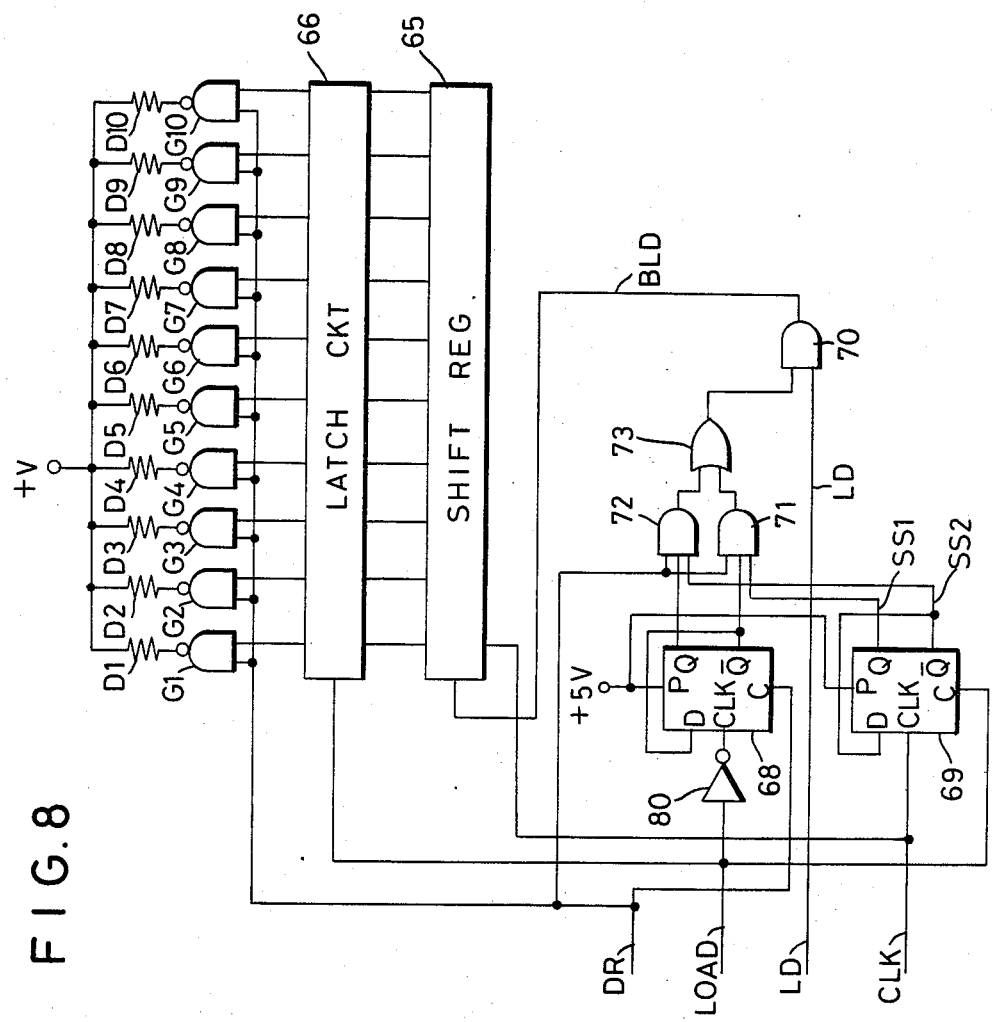
FIG. 8 is a block diagram of a first embodiment of the present invention.

FIG. 8 shows a circuit diagram of the present embodiment. The heating dots include ten dots $D_1, D_2, D_3, \ldots D_{10}$ corresponding to ten picture elements in one line. The level data signal LD is supplied to an AND gate 70, a clock signal CLK is supplied to a D flip-flop 69 and a shift register 65, and a load signal LOAD is supplied to an inverter 80, a latch circuit 66 and to flip-flop 69. A thermal head drive signal DR is supplied to a D flip-flop 68, AND gates 71 and 72 and NAND gates $G_1$ to $G_{10}$.

Figure 9:
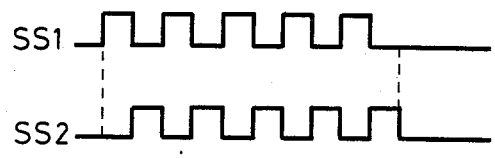
FIGS. 9, 10 and 11 show waveforms of signals shown in FIG. 8.
Figure 10:
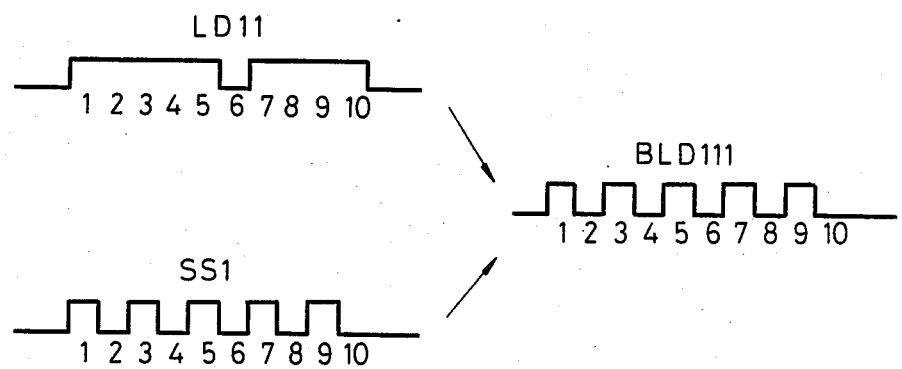

The heating dots $D_1, D_2, \ldots D_{10}$ are divided into a first block $B_1$ comprising odd-numbered dots $D_1, D_3, \ldots D_9$ and a second block $B_2$ comprising even-numbered dots $D_2, D_4, \ldots D_{10}$. The first block $B_1$ and the second block $B_2$ are printed at different timings. In order to attain the block printing, strobe signals $SS_1$ (for driving $B_1$) and $SS_2$ (for driving $B_2$) shown in FIG. 9 are supplied from the D flip-flop 69. The strobe signals $SS_1$ and $SS_2$ are alternately selected by the D flip-flop 68 and AND gates 71 and 72 for each gray level. Those strobe signals are ANDed with the level data $LD_{nx}$ by AND gate 70 so that the block corresponding to the strobe signal is energized for printing the X-th gray level corresponding to the strobe signal. In the odd-numbered gray level, the level data $LD_{11}$ and the strobe signal $SS_1$ are ANDed to produce a block level data signal $BLD_{111}$ shown in FIG. 10. The level data signals produced by comparing the n-th line of the image signal with the levels $L_1$ to $L_5$ are represented by $LD_{n1}$ to $LD_{n5}$.

The block level data signal $BLD_{111}$ is supplied to a data input terminal of the shift register 65. The signal $BLD_{111}$ is serially transferred to the shift register 65 by the clock signal CLK, and the shift register 65 parallelly transfers the signal $BLD_{111}$ to the latch circuit 66 by the load signal LOAD.

The output of the latch circuit 66 is NANDed with the drive signal DR by the NAND gates $G_1$ to $G_{10}$ so that current is supplied to the heating dots $D_1, D_3, D_5, D_7$ and $D_9$ of the block $B_1$ for a unit time period in accordance with the block level data signal $BLD_{111}$. As a result, Joule heats are generated and the density corresponding to the gray level 1 is printed at every other picture elements in the first line on the image sheet. The non-printed picture elements remain at density 0 or white level.

Figure 11:
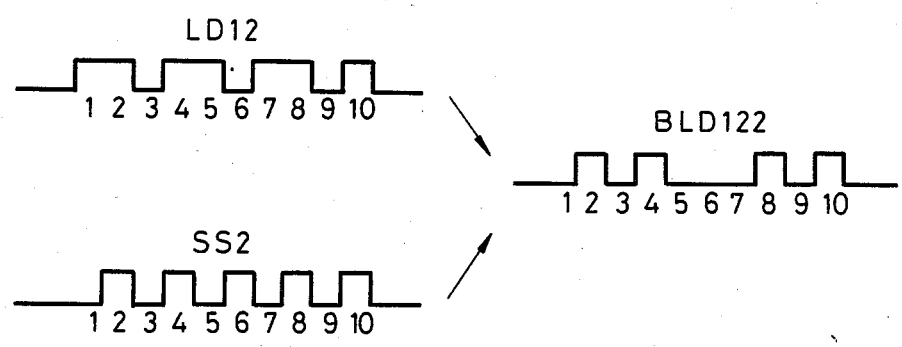

In the next even-numbered gray level, the density corresponding to the gray level 2 is printed in accordance with the level data $LD_{12}$. The level data $LD_{12}$ is ANDed with the strobe signal $SS_2$ for driving the block $B_2$. As a result, a block level data signal $BLD_{122}$ shown in FIG. 11 is produced. This signal is supplied to the data input terminal of the shift register 65 and processed in the same manner as the signal $BLD_{111}$ so that the picture elements of the gray level 2 are printed between the picture elements printed in the first line on the image sheet. Since the background remains non-printed or white, the density of the printed picture elements is to be equal to that of the gray level 1. But, the dots for the gray level 2 print have been heated by the heat of the dots heated during the gray level 1 print, and the print density is higher. As a result, picture elements which are close to the gray level 2 are produced although they are not overprinted.

The strobe signals are alternately switched to print the blocks $B_1$ and $B_2$ alternately. As a result, a picture element line having six gray levels is printed in the first line.

The image sheet is then moved to the next line an the next line of image signal is similarly processed to print the line.

Figure 12:
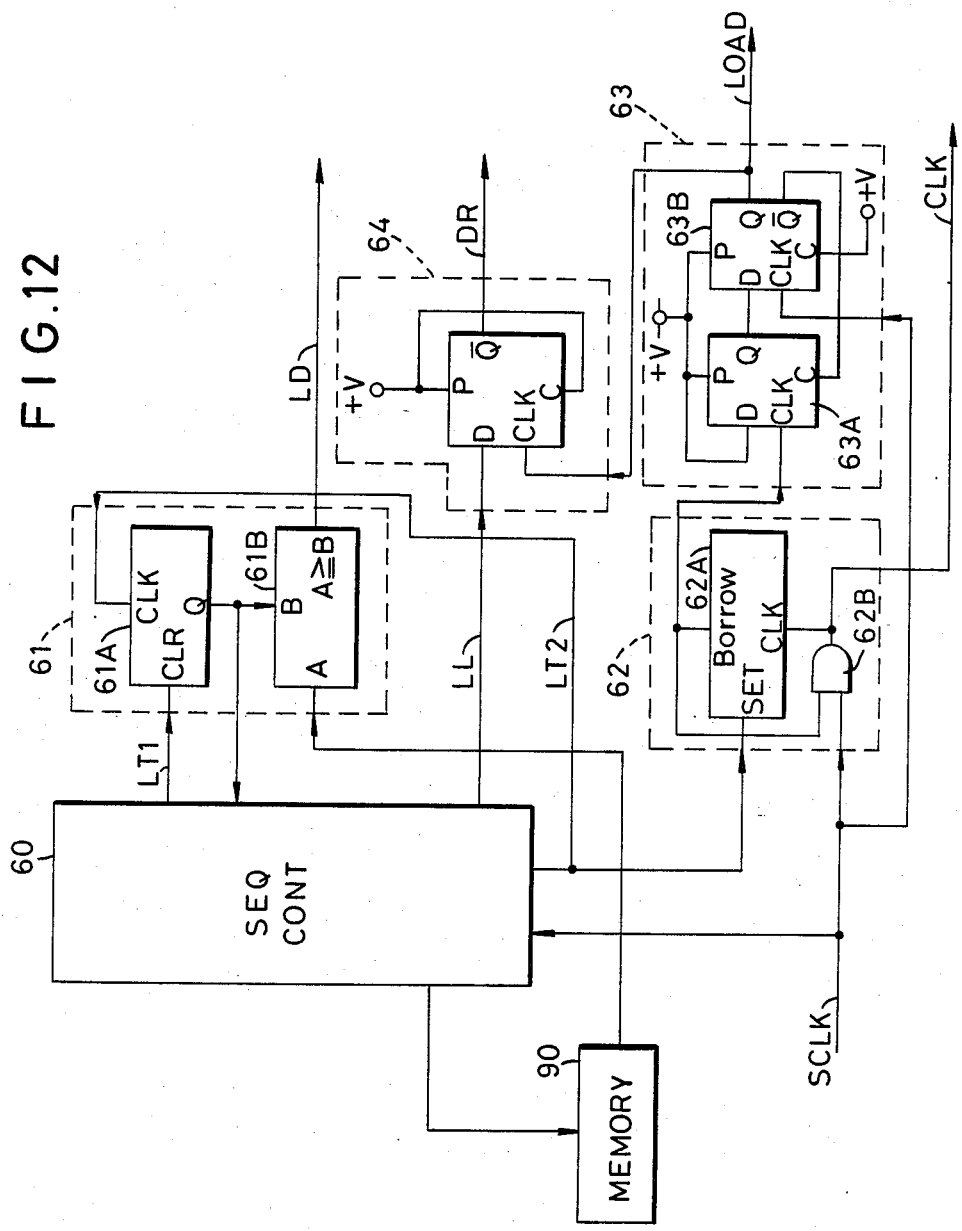
FIG. 12 is a block diagram of a detail of a portion of the first embodiment.

In FIG. 12, numeral 60 denotes a sequence controller which controls an overall timing. Numeral 61 denotes a level data signal generator, numeral 61A denotes an up-counter, numeral 61B denotes a comparator, numeral 62 denotes a clock signal generator, numeral 62A denotes a presettable down-counter, numeral 62B denotes an AND gate, numeral 63 denotes a load signal generator, numerals 63A and 63B denote D flip-flops, numeral 64 denotes a thermal head drive signal generator which comprsies a D flip-flop, and numeral 90 denotes a memory which stores an image signal therein.

Figure 13:
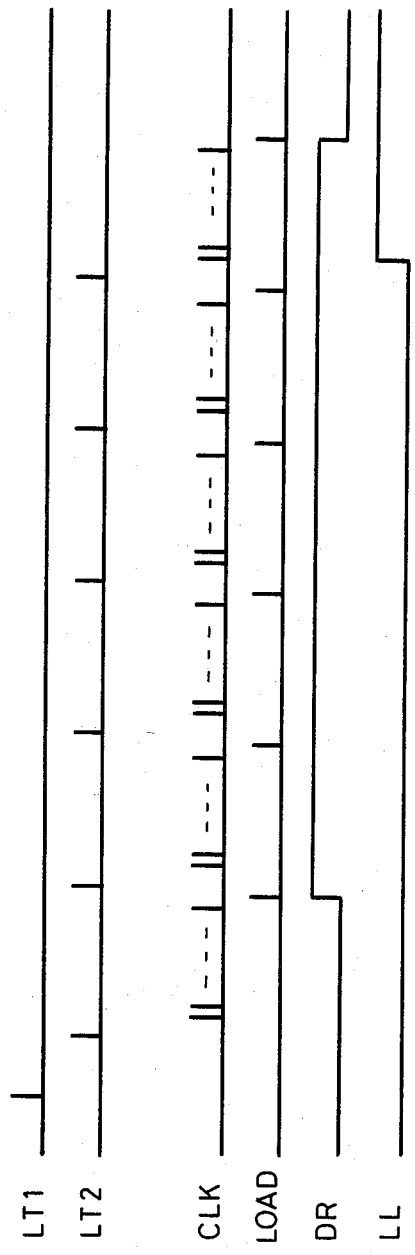
FIG. 13 is a time chart of the first embodiment.

The sequence controller 60 controls the overall timing. When one line is to be printed, it first produces a line trigger signal $LT_1$ to start the operation, and then produces a level trigger signal $LT_2$ to start to obtain the level data LD of the respective gray levels at a print time interval of each reference level. The up-counter 61A produces an output representing the count thereof. When the output of the up-counter 61A reaches "6", the sequence controller 60 produces a last level signal LL and does not produce the level trigger signal $LT_2$ until the line trigger signal $LT_1$ is produced to print the next line. The count of the up-counter 61A is reset to "0" by the line trigger signal $LT_1$ and the up-counter 61A counts the trigger signal $LT_2$. The up-counter 61A supplies the count to a B input terminal of the comparator 61B as the reference level. When the image signal level is equal to or larger than the reference level, the comparator 61B sets LD to a high level, and when the image signal level is smaller than the reference level, it sets LD to a low level. When the level trigger signal $LT_2$ is produced, the presettable down-counter 62A presets "10" which corresponds to the number of picture elements in one line. The presettable counter 62A counts down the input clock pulses starting from the preset count, and when the count reaches "0", it sets a borrow output to the low level. When the count "10" is preset by the level trigger signal $LT_2$, the borrow output is set to the high level. As a result, the system clock SCLK applied to the AND gate 62B is produced from the output terminal of the AND gate 62B as the clock signal. The presettable down-counter 62A counts down the clock signal, and when the count reaches "0", the borrow output is set to the low level. As a result, the AND gate 62B is. The AND gate 62B produces ten clock pulses which are equal in number to the number of heating dots, each time the level trigger $LT_2$ is produced. The D flip-flop 63A sets the output Q to the high level in response to the fall of the borrow signal, and the D flip-flop 63B produces the high level output one system clock pulse SCLK later than the high level Q output of the flip-flop 63A. As the Q output of the flip-flop 63B is set to the high level, the inverted output $\overline{Q}$ is set to the low level and the D flip-flop 63A is cleared. As a result, the output Q of the D flip-flop 63B is set to the low level one system clock pulse later. The load signal LOAD which is the output of the D flip-flop 63D is produced as a pulse signal for one system clock SCLK after the fall of the borrow output of the down-counter 62A. The thermal head drive signal generator is a D flip-flop which samples the last level signal LL by the load signal LOAD. Thus, as shown in FIG. 13, when the first load signal LOAD is produced in printing one line, the last level signal LL is at the low level, and when the load signal LOAD is applied, the $\overline{Q}$ DR of the D flip-flop 64 is set to the high level and remains at the high level until the sixth load signal LOAD is applied. When the sixth load signal LOAD is applied, the last level signal is at the high level. Thus, as the sixth level signal LOAD is applied, the thermal head drive signal DR which is the $\overline{Q}$ output of the flip-flop 64 is set to the low level.

The operation of the block diagram of FIG. 12 is now explained. The up-counter 61A resets the count to "0" by the line trigger signal $LT_1$ and then sets the count to "1" by the first level trigger signal $LT_2$. The reference level is "1". Then, the image signals for the respective picture elements stored in the memory 90 are sequentially supplied to the comparator 61B in synchronism with the clock signal CLK and compared with the reference level "1". The image data which ar equal to or higher than the reference level are converted to the high level data and the other image data are converted to the low level data. When the second level trigger signal is applied, the reference level is changed to "2" and a similar operation is repeated. One line of image data is repeatedly read from the memory unit each time the reference level changes until one line of print is completed.

Usually, a pseudo-outline appears in an image with 16 gray levels but does not appear in an image with 32 gray levels. In accordance with the present system, when the input image signal is reproduced with 32 gray levels, the reproduction time is susbstantially the same as that for the reproduction with 16 gray levels and the pseudo-outline does not appear.

Even if the dots are energized, they are not printed until the head is heated to a predetermined temperature. Accordingly, for the printing with the gray level 1, it is necessary to energize the dots for a predetermined time to heat the head to the predetermined temperature. This is called pre-heating. It is desirable to preheat the head with as large a current as possible in a short period because, since the head is designed to readily dissipate the heat. The head may not be heated to the predetermined temperature because the heat dissipation balances the heat generation if the dots are energized by a small current. Accordingly, current is temporarily stored in a capacitor and the stored current is discharged is the pre-heating current so that the dots are rapidly heated to the predetermined temperature.

In the present system, dots are divided into two blocks and printed at different timings to avoid the necessity of a large capacity power supply. Accordingly, it is extremely desirable to use a current storage capacitor in order to avoid the necessity of the large capacity power supply. The capacitor is very compact and inexpensive.

Figure 14:
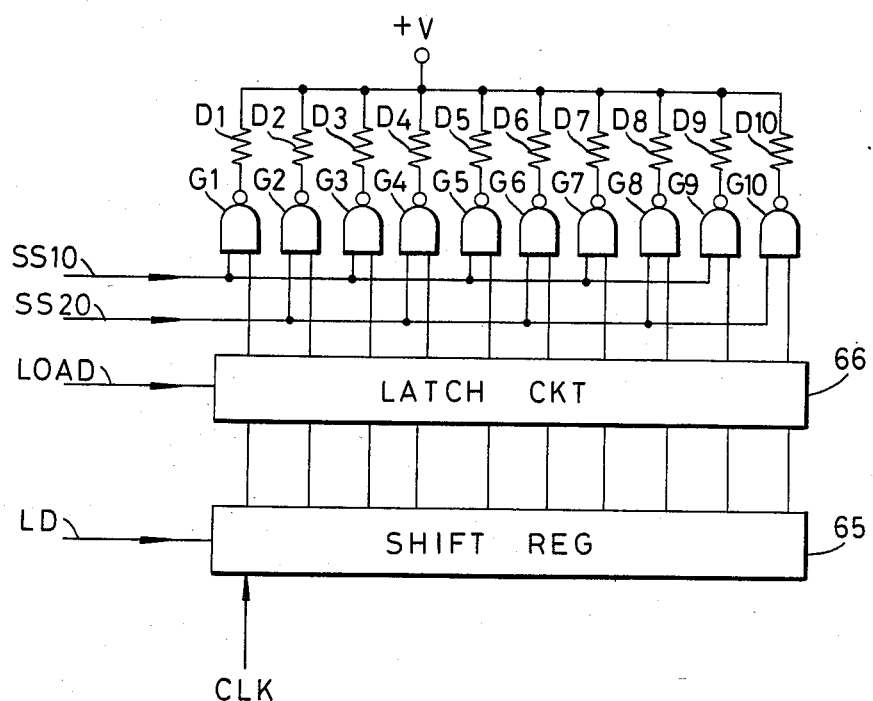
FIGS. 14 and 15 show block diagrams of a second embodiment of the present invention.

FIG. 14 shows a second embodiment of the present invention. The image signal is converted to the level data signals $LD_{11}$ to $LD_{15}$ in the manner described above and they are sequentially applied to the input of the shift register 65 (FIG. 14) in synchronism with the clock signal. The bit outputs of the shift register 65 are supplied to the latch circuit 66 when the load signal LOAD is generated. The bit outputs of the latch circuit 66 are supplied to the first inputs of the NAND gates $G_1$ to $G_{10}$. As described above, the heating dots $D_1$ to $D_{10}$ are divided into the odd numbered dot block $B_1$ ($D_1$, $D_3$, $D_5$, $D_7$, $D_9$) and the even numbered dot block $B_2$ ($D_2$, $D_4$, $D_6$, $D_8$, $D_{10}$). The strobe signal $SS_{10}$ is supplied to the second inputs of the NAND gates $G_1$, $G_3$, $G_5$, $G_7$ and $G_9$ connected to the heating dots of the block $B_1$, and the strobe signal $SS_{20}$ is supplied to the second inputs of the NAND gates $G_2$, $G_4$, $G_6$, $G_8$ and $G_{10}$ connected to the heating dots of the block $B_2$.

Figure 1:
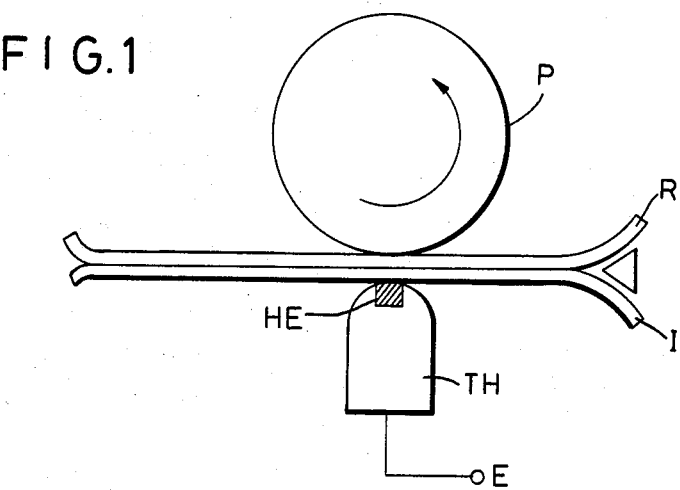
FIG. 1 is a conceptual view for illustrating a conventional thermal image recording system.
Figure 2A:
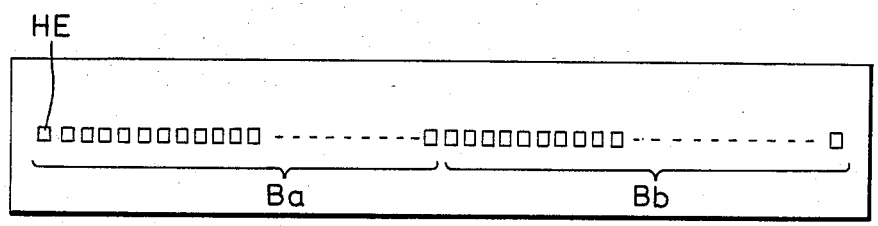
FIGS. 2A and 2B show heating dots of a prior art thermal head.
Figure 2B:
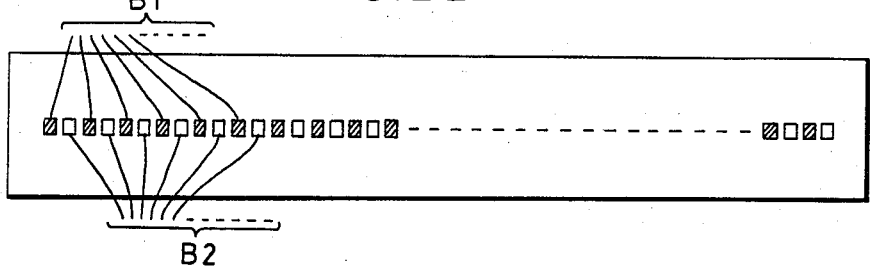
Figure 3:
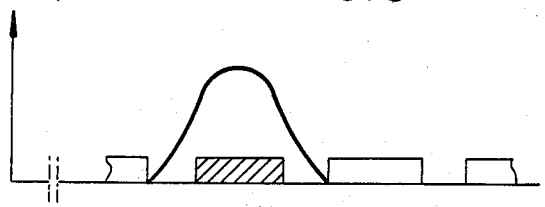
FIGS. 3, 4A, 4B and 4C show temperature distributions of heating dots.
Figure 4A:
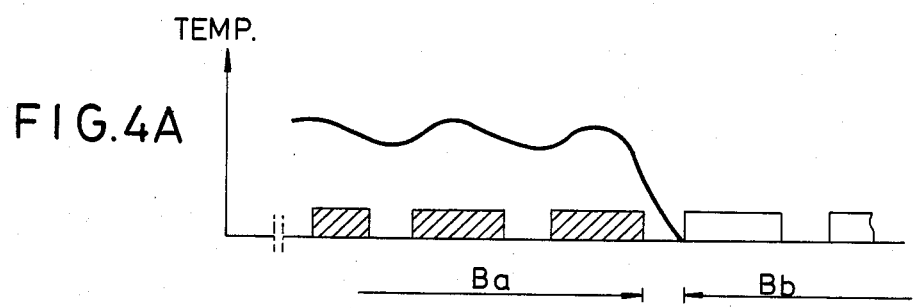
Figure 4B:
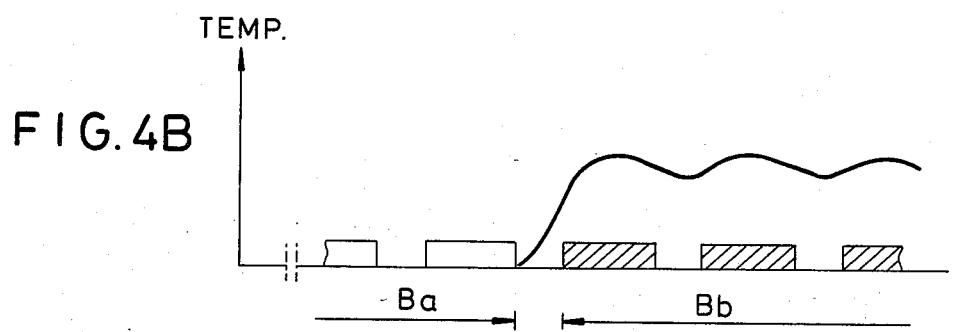
Figure 4C:
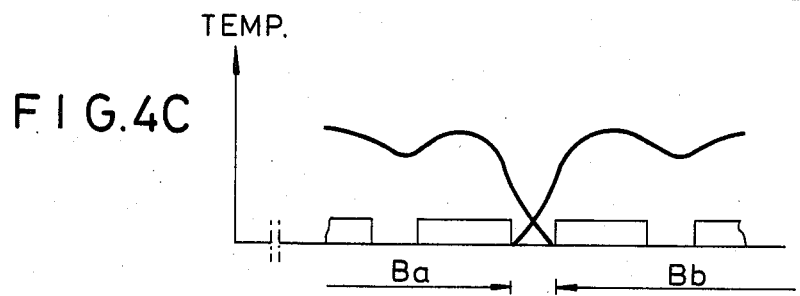
Figure 5:
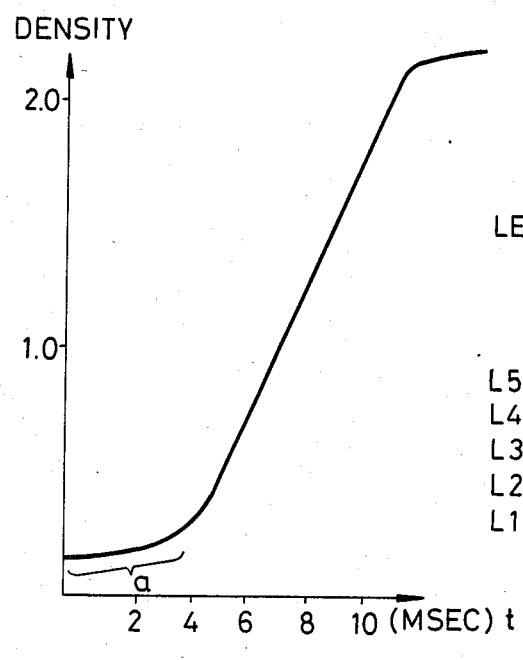
FIG. 5 shows a relationship between print time and print density.
Figure 16:
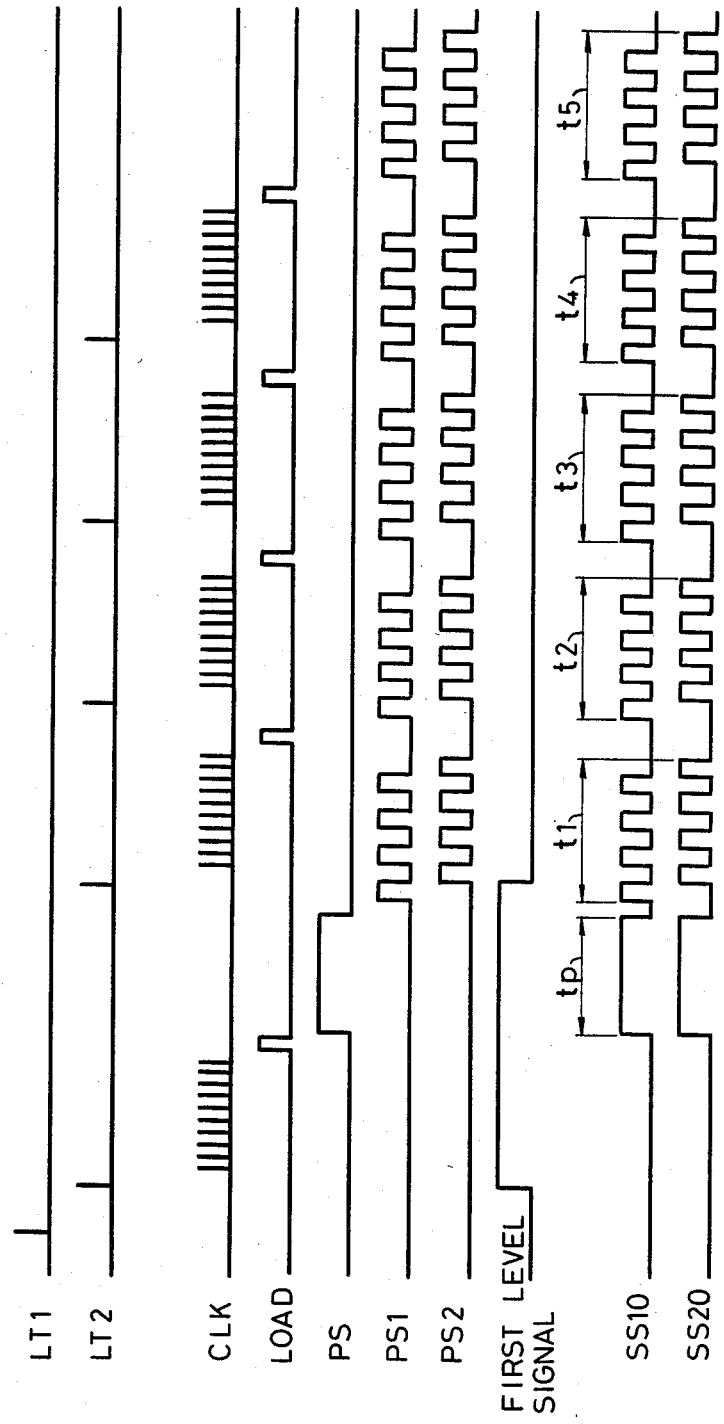
FIG. 16 is a time chart for the second embodiment.

As seen from FIG. 5, of the energization time of the thermal head, the first 2 to 3 milliseconds period) portion a in FIG. 5) is used to heat the thermal head itself and the image layer to the predetermined temperature and does not essentially contribute to the print operation. Accordingly, the strobe signals $SS_{10}$ and $SS_{20}$ are also provided with pre-heating period tp corresponding to the portion a as shown in FIG. 16. Following thereto, the strobe signals are generated for the respective density levels starting from the lowest density level. In the strobe signals $SS_1$ and $SS_2$ shown in FIG. 8, five groups of pulses for the five gray levels are generated. A time from the rise of the first pulse in the first group $SS_{10}$ to the fall of the last pulse of $SS_{20}$ is defined as $t_1$, a similar time for the second group is defined as $t_2$, a similar time for the third group is defined as $t_3$, a similar time for the fourth group is defined as $t_4$, and a similar time for the fifth group is defined as $t_5$. The times $t_1$ to $t_5$ are set such that a print density corresponding to the level data signal $LD_{11}$ or the density between the reference levels $L_1$ and $L_2$ is attained by energizing the heating dots of the thermal head for $tp+t_1$, a density corresponding to $LD_{12}$ is attained by energizing for $tp+t_1+t_2$, and a print density corresponding to $LD_{1n}$ is attained by heating for $tp+t_1+ \ldots +tn$ (n=1-5).

The operation of the present embodiment is now explained. The clock signal is generated by the clock signal generator 62 (FIG. 15) and the signal $LD_{11}$ is sequentially applied to the shift register 65 (FIG. 14) starting from the section 10 by the level data signal generator 61. After the signals for 10 dots have been applied, the load signal LOAD is produced by the load signal generator 630 (FIG. 15) and the data $LD_{11}$ is transferred to the latch circuit 66. Then, the level data signal generator 61 produces the level data $LD_{12}$ and sends it to the shift register 65 by the clock signal generator 62.

The thermal head is driven by the strobe signals $SS_{10}$ and $SS_{20}$ from the thermal head drive signal generator 640 in accordance with the level data signal $LD_{11}$. First, the thermal head is pre-heated for the time tp as described above. Since the $SS_{10}$ and $SS_{20}$ are ANDed with the level data signal $LD_{11}$ stored in the latch 66, all dots other than the dots with the "0" level data signal ($D_6$ in the present example) are pre-heated. Then, the printing is done by the strobe signals $SS_{10}$ and $SS_{20}$ in accordance with the level data signal $LD_{11}$. Since the $SS_{10}$ and $SS_{20}$ are out of phase from each other, the $D_1$, $D_3$, $D_5$, $D_7$ and $D_9$ which belong to the block $B_1$ and the $D_2$, $D_4$, $D_6$, $D_8$ and $D_{10}$ which belong to the block $B_2$ are alternately driven. Accordingly, if we look at a specific dot, for example, $D_3$, the total energization time during this period is one half of $t_1$, which is not sufficient for the time $t_1$ required to attain the density corresponding to $LD_{11}$. However, since $SS_{20}$ is "1" during the period in which $SS_{10}$ is "0" and $D_3$ is not energized, the $D_2$ and $D_4$ adjacent to the $D_3$ are energized. As a result, the $D_3$ is heated by the adjacent effect and print density which is essentially the same as that attained by heating $D_3$ for the time $t_1$ is attained.

After the printing by the level data signal $LD_{11}$, the load signal LOAD is generated by the load signal generator, and the next density level data signal $LD_{12}$ stored in the shift register 65 is transferred to the latch circuit 66. Then, the next level data signal $LD_{13}$ is sent to the shift register 65, and the strobe signals $SS_{10}$ and $SS_{20}$ for the level data signal $LD_{12}$ are generated so that the printing is done for the level corresponding to $LD_{12}$ for the time $t_2$. The above operation is repeated until the printing for the level data signal $LD_{15}$ is done, when one line of the image is printed. Then, the thermal head is relatively shited one line with respect to the thermal record medium and the level data signal is generated in accordance with the second line of the image signal, and the above operation is repeated from the first step. In this manner, a predetermined number of lines are printed. The above operation is repeated for each color of yellow, magenta and cyan (block) to attain color printing.

Figure 15:
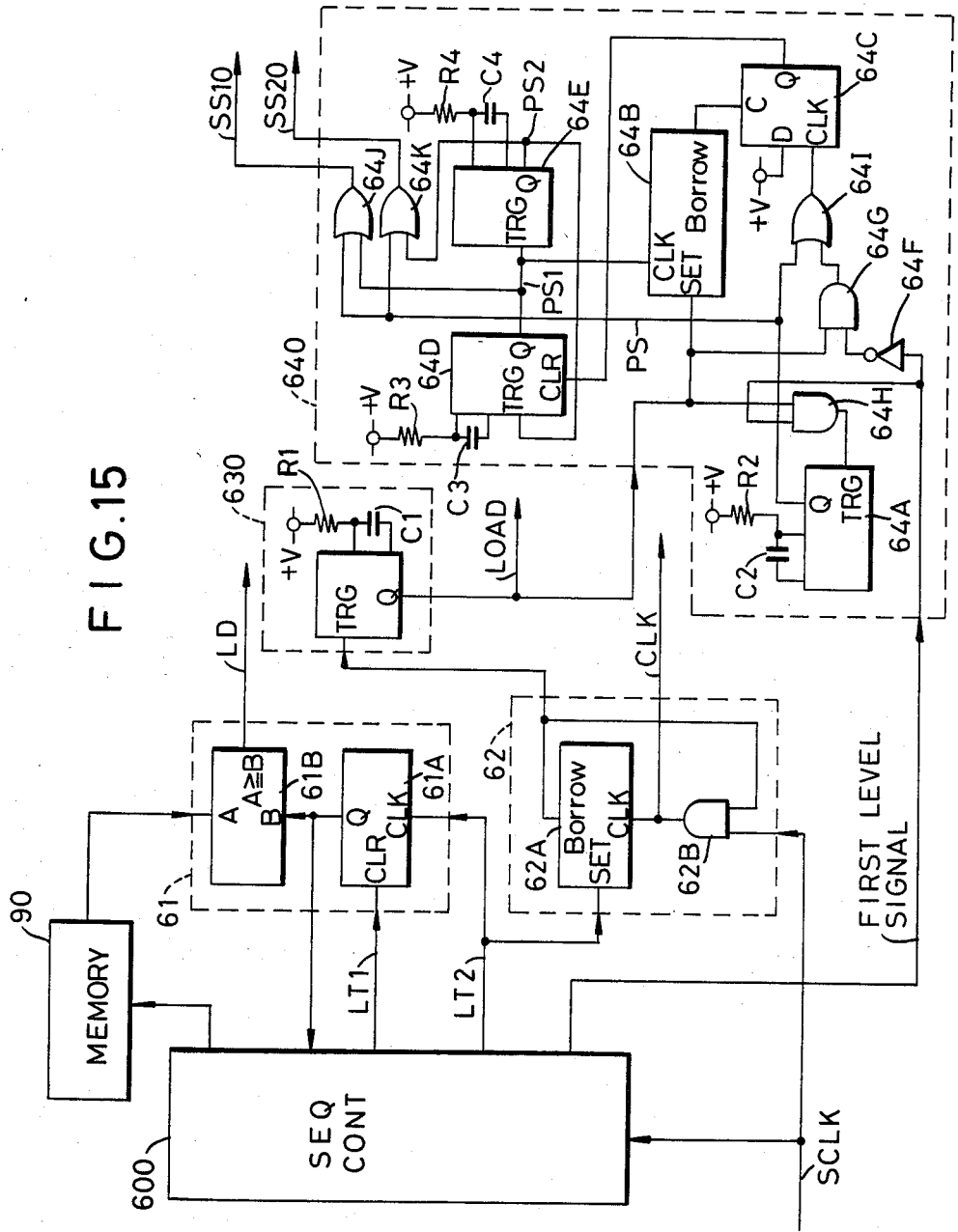

In FIG. 15, numeral 600 denotes a sequence controller comprising a microcomputer which controls the overall timing. The level data signal generator 61 and the clock signal generator 62 are configured in the same manner as those of FIG. 12. The load signal generator 630 comprises a monostable multivibrator. A thermal head driving signal generating circuit 640 comprises monostable multivibrators 64A, 64D and 64E, a presettable counter 64B, a D flip-flop 64C, an inverter 64F, AND gates 64G and 64H and OR gates 64I, 64J and 64K.

The sequence controller 600 controls the overall timing. When a first line is to be printed, it produces a line trigger signal $LT_1$ and as many level trigger signals $LT_2$ as the number of reference levels to obtain the level data for the respective gray levels, and monitors the reference level at the output of the up-counter 61A, and when it is "1", it sets the first level signal to the high level.

The monostable multivibrator 630 responds to the fall of the borrow signal of the presettable down-counter 62A to produce the load signal LOAD which is a pulse having a duration determined by $C_1$ and $R_1$. The monostable multivibrator 64A responds to the fall of the load signal to produce a pulse (PS in FIG. 16) having a duration determined by $C_2$ and $R_2$.

The presettable down-counter 64B is initialized by the load signal LOAD and counts down the pulse $PS_1$ applied to the clock input terminal, and when the count reaches "0", it change the borrow signal from the high level to the low level. The D flip-flop 64C responds to the fall of the output of the OR gate 64I to change its output Q to the high level, and when the borrow signal of the presettable down-counter 64B is set to the low level, the flip-flop 64C sets the output Q to the low level. The monostable multivibrator 64D produces the pulse $PS_1$ having a duration determined by $C_3$ and $R_3$ in response to the rise of the input at the CLR terminal when the input at the TRG terminal is low, and produces the pulse $PS_1$ having the duration determined by $C_3$ and $R_3$ in response to the fall of the input $PS_2$ at the TRG terminal when the input at the CLR terminal is high. When the input at the CLR terminal is low, it does not produces the pulse. The monostable multivibrator 64E produces the pulse $PS_2$ having a duration determined by $C_4$ and $R_4$ in response to the fall of the output pulse of the monostable multivibrator 64D. The inverter 64F, AND gates 64G and 64H, and OR gate 64I form a circuit to select the pulse to be applied to the CLK terminal of the D flip-flop 64C. When the first level signal is high, the output pulse of the monostable multivibrator 64A is supplied to the CLK terminal of the D flip-flop and when the first level signal is low level, the load signal is supplied.

The OR gate 64J produces the pulse PS and the strobe pulse $PS_1$ as the strobe signal $SS_{10}$. The OR gate 64K produces the pulse PS and the strobe pulse $PS_2$ as the strobe signal $SS_{20}$.

When the first line is to be printed, the sequence controller 600 produces the line trigger signal $LT_1$. Thus, the up-counter 61A sets the reference level to "0". The sequence controller 600 then produces the level trigger signal $LT_2$ and the counters 61A and 62A operate in the manner shown in FIG. 12. Since the reference level is now "1", the sequence controller 600 sets the first level signal to the high level. The image signal which is the image data of the picture elements is sequentially supplied to the comparator 61B in synchronism with the clock signal CLK. since the reference level is now "1", the $LD_{11}$ is produced as the level data and it is supplied to the shift register 65 in synchronism with the clock signal CLK. When the borrow signal of the presettable down-counter 62A is set to the low level, that is, when the level data $LD_{11}$ for the ten heating dots has been outputted, the monostable multivibrator 630 produces the load signal LOAD and the level data $LD_{11}$ is latched in the thermal head latch circuit 66. When the load signal LOAD is produced, a count "4" is preset in the presettable down counter 64B, which count corresponds to the number of strobe pulses $PS_1$ and $PS_2$ for each gray level. When the first level load signal is produced, the first level signal is high and the load signal is not produced from the AND gate 64G but is produced from the AND gate 64H. Accordingly, monostable multivibrator 64A produces the pulse PS having the duration of the pre-heating period determined by $R_2$ and $C_2$. The pre-heating pulse PS is supplied to the OR gates 64J and 64K and also to the OR gate 64I. When the pre-heating pulse PS becomes low, the output of the D flip-flop 64C is set to the high level and the CLR input of the monostable multivibrator 64D is set to the high level so that the pulse $PS_1$ having the duration determined by $R_3$ and $C_3$ is produced. As the output pulse $PS_1$ of the monostable multivibrator 64D changes to the low level, the monostable multivibrator 64E is triggered and produces the pulse $PS_2$ having the duration determined by $R_4$ and $C_4$. When $PS_2$ changes to the low level, the monostable multivibrator 64D is triggered and produces the pulse $PS_1$. The above operation is repeated. The presettable down-counter 64B having "4" preset by the load signal counts the pulses $PS_1$. When it counts four $PS_1$, it sets the borrow signal to the low level so that the output of the D flip-flop 64C is reset to the low level and the monostable multivibrator 64D stops to produce the pulse $PS_1$. As to $PS_2$, the monostable multivibrator 64D is triggered by the fourth $PS_1$ to produce the fourth $PS_2$, and then stops producing the pulse until it is next triggered. The pulse $PS_1$ is also supplied to the OR gate 64J and the pulse $PS_2$ is supplied to the OR gate 64K. In this manner, the translation and the printing of the first level data are carried out. The translation of the level data for the second level $L_2$ is started after the first load signal LOAD has been produced. Since the level data $LD_{11}$ has been latched in the latch circuit 66 by the load signal LOAD, the sequence controller 600 produces the level trigger signal $LT_2$ at an appropriate timing and the up-counter 61A sets the reference level to "2". Then, the level data $LD_{12}$ is transferred to the thermal head shift register circuit 65 in the same manner as that for the first level, and at the end of the transfer, the load signal is produced so that the level data $LD_{12}$ is latched in the latch circuit 66. The first level signal is now low and the monostable multivibrator 64A is not triggered. The load signal LOAD is produced from the AND gate 64G and the D flip-flop 64C is triggered by the OR gate 64I. Then, four $PS_1$ and four $PS_2$ are produced by the OR gates 64J and 64K as $SS_{10}$ and $SS_{20}$ in the same manner as that for the first level.

Figure 17:
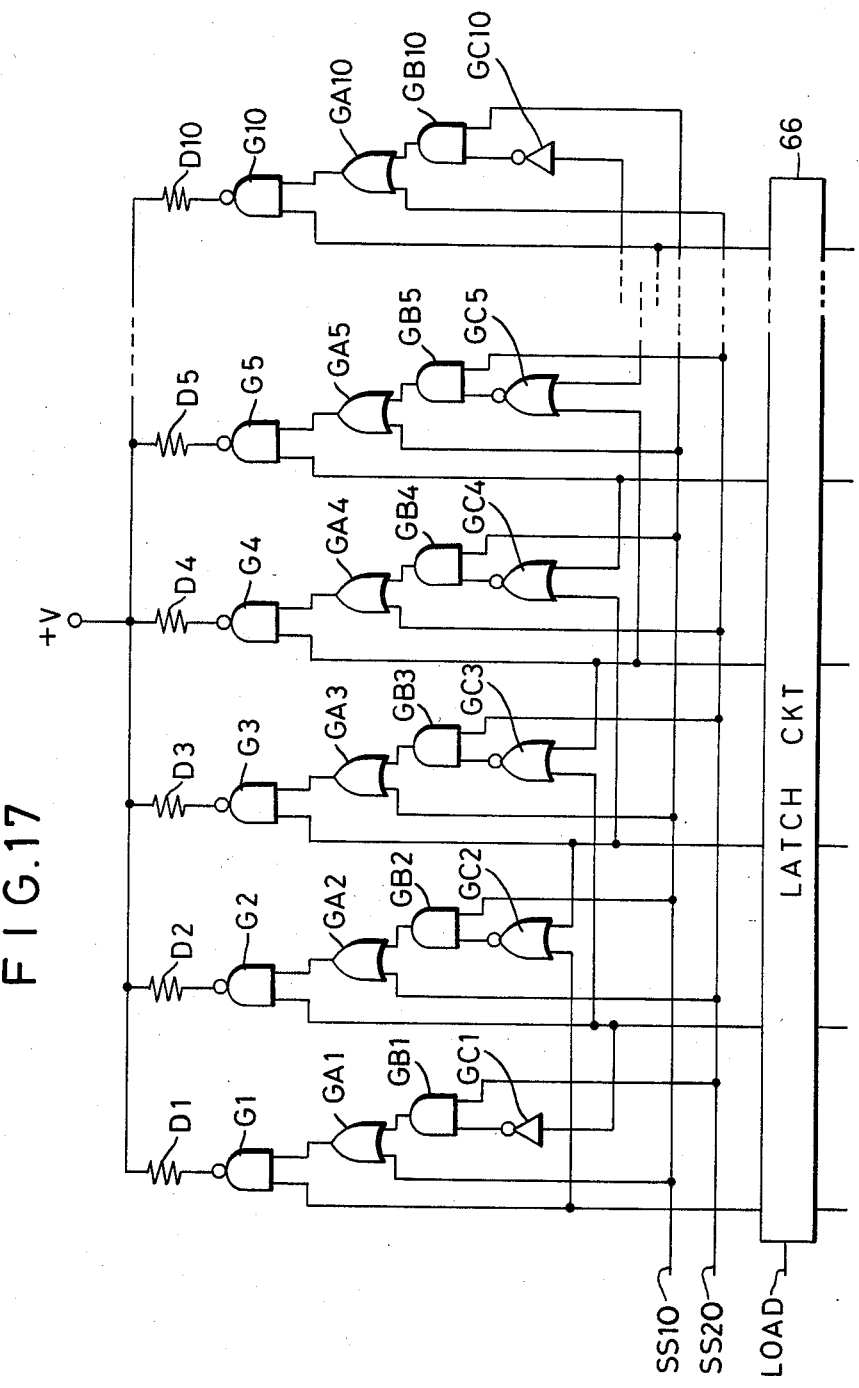
FIG. 17 shows an improvement of the second embodiment.

In the above arrangement, when the adjacent heating dot is not energized in a specific level, for example, the dot in the section 5 in FIG. 7 when the level corresponding to $LD_{14}$ is to be printed, the adjacent effect by the adjacent dot is not attained and the density may be under the required level. An improvement therefor is shown in FIG. 17, in which only the portion from the latch circuit 66 to the heating dots $D_1$ to $D_{10}$ is shown. The remaining configuration is identical to that shown in the embodiment of FIG. 14. Like elements to those shown in the embodiment of FIG. 14 are designated by like numerals. A difference from FIG. 14 lies in that a logic circuit comprising gate circuits $GA_n$, $GB_n$ and $GC_n$ (n=1-10) is added between the NAND gates $G_1$-$G_{10}$ and the lines of the strobe signals $SS_{10}$ and $SS_{20}$. When we look at the $D_3$ line, for example, the first input terminal of the NAND gate $G_3$ is connected to the latch circuit 66 to input the level data in the section 3, and the second input terminal is connected to the output of the OR gate $GA_3$. The strobe signal $SS_{10}$ is supplied to the first input of the OR gate $GA_3$ and the second input is connected to the output of the AND gate $GB_3$. The other strobe signal $SS_{20}$ is supplied to the first input terminal of the AND gate $GB_3$ and the second input terminal is connected to the output terminal of the NOR gate $GC_3$. The level data signal of the immediately preceeding dot or the dot in the section 2 and the level data signal of the immediately succeeding dot or the dot in the section 4 are supplied to the input terminal of the NOR gate $GC_3$.

When the strobe signals $SS_{10}$ and $SS_{20}$ shown in FIG. 16 are supplied, the dots belonging to the odd-numbered block $B_1$ and the dots belonging to the even-numbered block $B_2$ are alternately driven so long as the level data signals of the adjacent sections 2 and 4 are "1", but when the level data signals of the dots in the sections 2 and 4 are "0", that is, non-print state, the output of the $GC_3$ becomes "1" and the strobe signal $SS_{10}$ as well as the strobe signal $SS_{20}$ are supplied to the NAND gate $G_3$ and the dot $D_3$ is thereafter continuously energized. In this manner, the shortage of the print density which would be caused when both adjacent dots are not energized is prevented. This is equally applicable to other heating dots. For the opposite end dots $D_1$ and $D_{10}$, it is equivalent that the level data signal of one adjacent dot is always "0". Accordingly, only the other adjacent dot signal may be processed. Accordingly, $GC_1$ and $GC_{10}$ may be simple inverters.

In an embodiment of FIG. 18, the NOR gates $GC_n$ (n=2-9) in FIG. 17 are replaced by NAND gates $GC_n'$ (n=2-9), and when at least one of the level data of the adjacent dots is "0", both the strobe signals $SS_{10}$ and $SS_{20}$ are applied to that dot. Since this condition is always met for the opposite end dots $D_1$ and $D_{10}$ both strobe signals are normally applied. When the level data of one of the adjacent dots is "0" and the other is "1", both strobe signals are applied and that dot may be apt to be higher density than that of the adjacent dots by the adjacent effect. However, this tends to emphasize the edges and is rather desirable for the printout of the image.

In the above embodiments, a thermal head having ten heating elements in one line is used to print an image having six gray levels, although any number of dots and any number of gray levels may be used.

What we claim is:

1. A printer comprising:
   (a) image signal generating means for repeatedly generating one line of image signal a plurality of times;
   (b) comparison means having a plurality of reference levels to be compared with the image signal, said comparison means selecting the reference level to be compared each time one line of image signal is generated and generating a comparison signal each time the image signal is compared with the selected reference level;
   (c) thermal head means having a plurality of elements arranged in a line and adapted to generate heat when energized;
   (d) supply means for supplying currents to said plurality of elements to energize said plurality of elements; and
   (e) control means for controlling said supply means, said control means inhibiting said supply means from supplying currents to said elements belonging to a first group in response to each of a plurality of comparison signals corresponding to one part of said plurality of reference levels and inhibiting said supply means from supplying currents to said elements belonging to a second group in response to each of a plurality of comparison signals corresponding to a remaining part of said plurality of reference levels, each of said elements of said first group being not adjacent to two elements in said first group, and said second group consisting of the elements not belonging to said first group.

2. A printer according to claim 1, wherein said control means comprises gate means connected to said supply means, first inhibition means for generating a first inhibition signal in response to each of a plurality of comparison signals corresponding to said one part of said plurality of reference levels, and second inhibition means for generating a second inhibition signal in response to each of a plurality of comparison signals corresponding to said remaining part of said plurality of reference levels, wherein said gate means inhibits said supply means from supplying currents to a plurality of elements belonging to said first group in response to said first inhibition signal and inhibits said supply means from supplying currents to a plurality of elements belonging to said second group in response to said second inhibition signal.

3. A printer according to claim 1, wherein said control means controls said supply means so that said supply means supplies currents to said elements of said first group and said elements of said second group alternately in response to each of a plurality of comparison signals corresponding to said plurality of reference levels.

4. A printer according to claim 3, wherein said control means comprises gate means connected to said supply means, first inhibition means for generating a first inhibition signal in response to each of a plurality of comparison signals corresponding to said one part of said plurality of reference levels, and second inhibition means for generating a second inhibition signal in response to each of a plurality of comparison signals corresponding to said remaining part of said plurality of reference levels, wherein said gate means inhibits said supply means from supplying currents to a plurality of elements belonging to said first group in response to said first inhibition signal and inhibits said supply means from supplying currents to a plurality of elements belonging to said second group in response to said second inhibition signal.

5. A printer according to claim 4, wherein said control means comprises means for controlling said first inhibition means and said second inhibition means so that said first and second inhibition signals are generated alternately in response to each of comparison signals corresponding to all of said plurality of reference levels.

6. A printer according to claim 5, wherein a plurality of elements belonging to said first group are adjacent to a plurality of elements belonging to said second group.

7. A printer comprising:
   (a) image signal generating means for repeatedly generating one line of image signal a plurality of times;
   (b) comparison means having a plurality of reference levels to be compared with the image signal, said comparison means selecting the reference level to be compared each time one line of image signal is generated and generating a comparison signal each time the image signal is compared with the selected reference level;
   (c) thermal head means having a plurality of elements arranged in a line and adapted to generate heat when energized;
   (d) supply means for supplying currents to said plurality of elements to energize said plurality of elements;
   (e) setting means for setting a continuous energization period for the supply of the currents to said plurality of elements by said supply means each time the comparison signal is generated for a selected reference level; and
   (f) control means for controlling said supply means, said control means inhibiting said supply means from supplying currents to said elements belonging to a first group in a first period and inhibiting said supply means from supplying currents to said elements belonging to a second group in a second period, said control means controlling said supply means so that said first period and said second period are provided alternately during said continuous energization period, each of said elements of said first group being not adjacent to two elements in said first group, and said second group consisting of the elements not belonging to said first group.

8. A printer according to claim 7, wherein said control means comprises gate means connected to said supply means, inhibition means for generating a first inhibition signal and a second inhibition signal alternately during said continuous energization period, wherein said gate means inhibits said supply means from supplying currents to a plurality of elements belonging to said first group in response to said first inhibition signal and inhibits said supply means from supplying currents to a plurality of elements belonging to said second group in response to said second inhibition signal.

9. A printer according to claim 7, wherein said elements belonging to said first group are adjacent to said elements belonging to said second group.

10. A printer according to claim 7, wherein further comprises detection means for detecting that at least one element of said second group is not energized during said second period and for generating a detection signal, wherein said control means responds to said detection signal to control said supply means so that one of said elements of said first group adjacent to said at least one element of said second group is energized during said second period.

11. A printer according to claim 10, which further comprises another detection means for detecting that at least one element of said first group is not energized during said first period and for generating another detection signal, wherein said control means responds to said another detection signal to control said supply means so that one of said elements of said second group adjacent to said at least one element of said first group is energized during said first period.

* * * * *